July 18, 1961
C. T. LEWIS
2,992,707
BRAKE BAND AND BLOCK THEREFOR
Filed Aug. 13, 1958
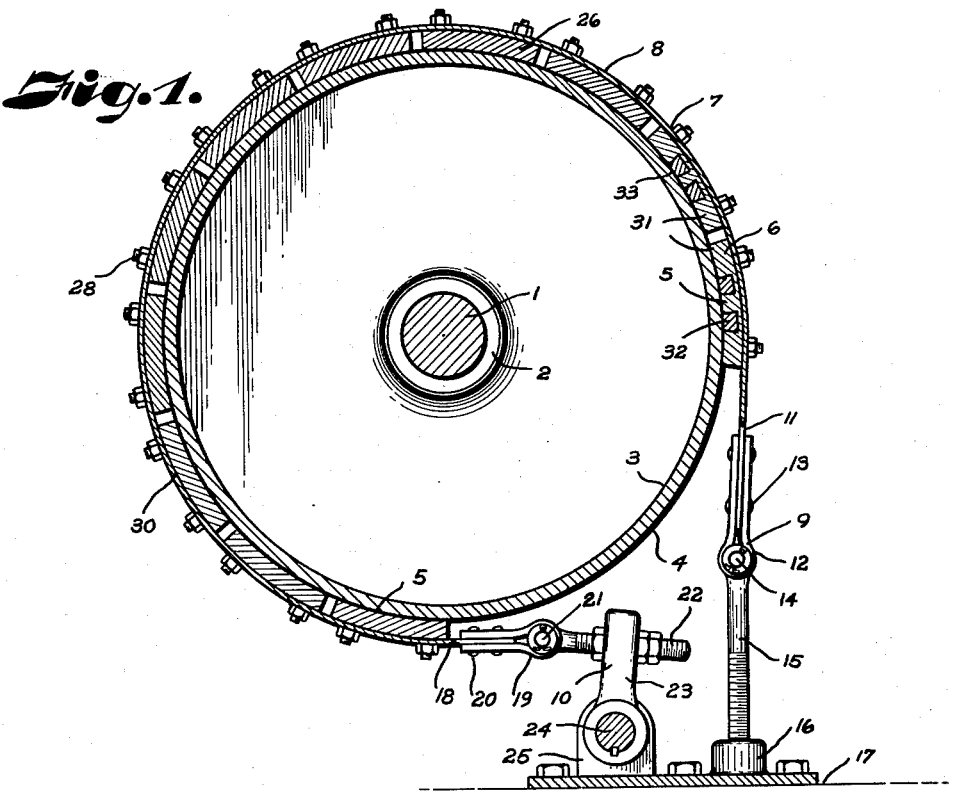
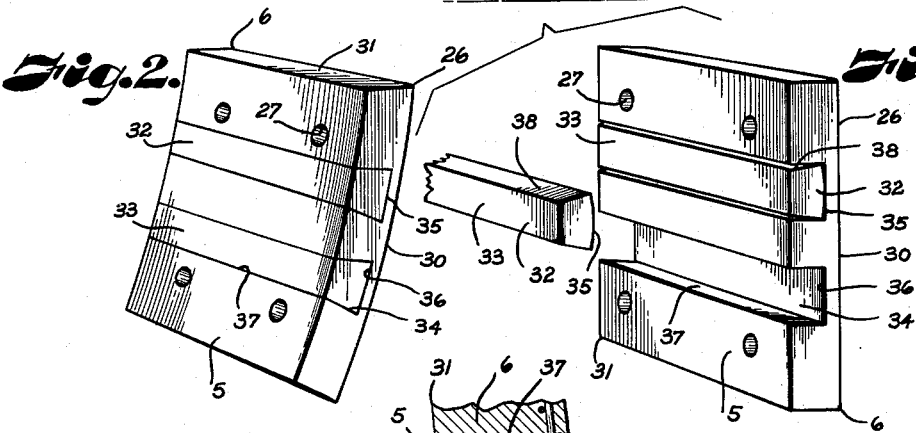
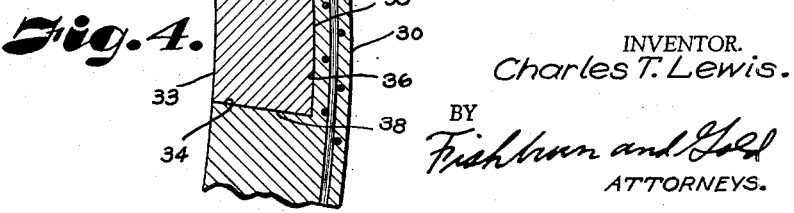
INVENTOR.
Charles T. Lewis.
BY
ATTORNEYS.

2,992,707
BRAKE BAND AND BLOCK THEREFOR
Charles T. Lewis, Oklahoma City, Okla.
Filed Aug. 13, 1958, Ser. No. 754,768
2 Claims. (Cl. 188—77)

This invention relates to brake bands and blocks therefor, and more particularly to brake band and like friction structures employed in heavy duty equipment such as oil field draw works and the like for braking purposes.

In the drilling of oil wells and the like, as with rotary drilling tools, it is necessary to frequently pull and run the drill pipe in the bore hole for the changing of drill bits and the like, and during such pulling and running in of the drill pipe, the tremendous weight load of the drill pipe has to be stopped many times with the draw works' brake mechanism. The principal part of the draw works is a rotating steel drum on which the cable is wound and unwound, and on each side of the drum there is a cylindrical surface usually the periphery of an annular flange, and a steel band is positioned around said peripheral or brake surface, said steel band carrying asbestos brake lining or blocks which are engaged with the brake surface to stop the load. The brake surfaces on the drum or flanges are exposed to much heat and abrasion while the draw works is turning, and also to blowing dust when the draw works is stationary, which results in the accumulation of abrasive material causing excessive wear and heat not only to the asbestos brake blocks but also to the draw works' drum brake flanges or rims, and frequently results in severe scoring of the brake surfaces of the flanges. The excessive abrasion and heat causes such wear that frequent replacements of the brake blocks and drum flanges are required and such replacements are very expensive due to the necessity of the entire drilling rig being shut down for the time necessary for the making of the replacements. Molded asbestos brake blocks have been used to provide longer life to the brake blocks; however, the molded asbestos brake blocks, because of their hardness, do not provide enough friction power to insure stopping the load when running or withdrawing the drill stem and bit from the bore hole. It is, therefore, common practice to use woven asbestos brake blocks or lining in order that the block or lining will have the flexibility to conform to the flanges and provide sufficient friction power to insure stopping of the load. Scored or grooved brake surfaces on the drum flanges result in excessive abrasion and wear and short life for the woven blocks or bands.

The principal objects of the present invention are to provide a novel brake band and lining therefor which will overcome the above-mentioned difficulties and extend the life of the brake lining and drum flanges; to provide a brake with a brake element of woven asbestos with molded asbestos inserts extending transversely of the braking face thereof for engaging and smoothing the brake surface during brake application; to provide such a brake element with a plurality of spaced transverse inserts adjacent the stationary or anchored end of the band to scour and wipe the brake surface engaged thereby for maintaining same smooth and thereby increase the braking efficiency of the friction contact between the band and brake flange; and to provide a brake band and brake lining therefor which is economical to manufacture and efficient in use in maintaining smooth drum flanges for increased friction power and longer life of the lining and drum flanges.

Other objects and advantages of this invention will become apparent from the following description taken in connection with the accompanying drawings wherein are set forth by way of illustration and example certain embodiments of this invention.

FIG. 1 is a transverse sectional view through a brake drum and brake band embodying features of the present invention.

FIG. 2 is a perspective view of a brake block and inserts in curved condition as when applied to the brake band.

FIG. 3 is a disassembled perspective view of the brake block and inserts before assembly thereof.

FIG. 4 is an enlarged detailed sectional view through the brake block and inserts in assembled relation.

Referring more in detail to the drawings:

1 designates a shaft of an element to be braked, for example, a shaft supporting a cable drum of oil field drilling rig draw works. The shaft carries a hub 2 having a rim or flange 3 with a cylindrical peripheral surface 4 forming a moving surface adapted to be engaged by the inner wearing surfaces or faces 5 of brake lining or element 6 of a brake member 7. In the illustrated structure, the brake member 7 includes a metallic band or strap 8 which extends around the outer periphery of the flange 3 with one end anchored as at 9 and the other end connected to a movable member 10 operable to tighten or loosen the band relative to the flange 3. In the illustrated structure, the end 11 of the band or strap 8 has an eye member 12 suitably secured thereto as by rivets 13, said eye member 12 being sleeved on a pin 14 of a T-bolt 15 suitably mounted in a bracket 16 fixed on a floor or base member 17. The other end 18 of the band has an eye member 19 fixed thereon as by rivets or the like 20, said eye member being connected by a pin 21 with an eye bolt 22 adjustably mounted in an arm 23 of the movable member 10 which is fixed on a shaft 24 carried in bearing members 25 supported on the base or floor 17 whereby rotation of the shaft 24 by means of a brake lever or the like will swing the arm 23 with movement to the left, FIG. 1, loosening the band relative to the brake flange, and movement of the arm 23 to the right, FIG. 1, will tighten the band about said brake flange 3. The particular mounting and connections of the end of the brake band to the anchor and to the movable member are exemplary only, and it is to be understood that any conventional band supporting and actuating structure may be used.

The metallic band or strap 8 is preferably of spring material, the resiliency of which normally tends to move same outwardly away from the flange 3.

The brake lining 6 may be a continuous strip of woven lining material where the loads to be controlled are such that the thickness of the lining permits sufficient flexibility in the brake band. However, in heavy duty applications, such as oil field drilling rig draw works, it is common for the lining to be of a thickness of 1-inch or more, and in such applications it is desirable that the woven lining be arranged in a plurality of spaced blocks 26, each provided with suitable counter-sunk apertures 27 through which fastening means such as bolts 28 are inserted to securely hold the blocks to the band or strap 8. The woven brake lining 6, whether in a continuous strip or in the blocks 26, is preferably formed of a high grade asbestos spinning fiber spun into yarn and twisted with a suitable metal wire, for example, a zinc alloy wire, and tightly woven into one piece under very high tension and then impregnated with a high heat-resisting resin material and cured to provide a dense mass that is impervious to water, oils, grease and the like. Also, the woven fabric preferably has a wire mesh reinforcement 29 adjacent to the outer surface 30 but within the mass of the lining or block, as illustrated in FIG. 4. The lining or block for a susbtantial portion of the brake band from the movable end 18 is of the woven asbestos material in which all of the friction or wearing face 5 is preferably of the same character for maximum friction power or holding power when in contact with the drum flange 3 as when the brake is applied. Certain portions of the lining or block, as for example in the illustrated structure the two blocks 31 adjacent the anchored end 11 of the band, are provided with spaced inserts 32 formed of a hard molded asbestos which has a flange engaging or wearing face 33 that will scour and wipe the flange periphery 4 with a slight abrading action that will tend to maintain said peripheral surface 4 in a smooth cylindrical condition, and thereby eliminate scores or grooves therein. In the illustrated structure, the blocks 31 are identical in structure, each having spaced insert receiving grooves 34 therein extending transversely of the direction of movement of the moving surface 4 of the flange 3 or across the flange engaging face thereof. The inserts 32 are shaped to conform to the shape of the grooves 34 when the blocks 31 are arcuate with the rear faces 35 having a radius corresponding to the inner radius of the band or strap 8, and with the inserts suitably secured to the brake block. In the illustrated structure, the block while in a straight condition, as illustrated in FIG. 3, has the grooves 34 machined therein with the bottom surface 36 parallel to the back surface 35 and the sides 37 of the groove parallel. When the block is curved, as illustrated in FIG. 2, the sides 37 of the groove are inclined whereby they converge toward the inner surface or brake engaging surface thereof. The inserts 32 are preferably shaped to substantially correspond to the shape of the grooves 34 and fill same when the block is in curved condition with the inclined sides 38 of the insert having a slightly greater spacing, particularly at the inner face 33 whereby curving of the block applies pressure between the sides 37 of the groove and the sides 38 of the insert, tending to hold the inserts in place in the groove. It is also preferable that a suitable adhesive capable of withstanding relatively high temperatures be applied to the contacting faces of the inserts and grooves to securely anchor the inserts in the blocks. The inner surfaces 33 of the insert are flush or even with the inner faces of the block to provide a relatively even surface therebetween. With this arrangement of the insert in the woven blocks, the entire assembly retains the flexibility of the woven lining blocks whereby the woven portions will readily conform to the flanges 3 for maximum frictional engagement with the peripheral surface 4 thereof.

In operation of a structure constructed as described, the shaft 24 is rotated to move the arm 23 whereby the band 8 is loosened relative to the flange 3 to disengage the inner surface of the lining from the periphery 4 of said flange 3 whereby the shaft 1 is free to turn. When it is desired to brake the structure to slow or stop the rotation of the shaft 1, the shaft 24 is rotated to swing the arm 23 to the right, FIG. 1, tightening the band about the brake lining 3, and engaging the inner surfaces of the brake lining with the periphery 4 of the flange 3. The woven brake lining readily conforms to the flange surface 4 for frictional engagement therewith and maximum holding power, and during the rotation of the shaft 1 and flange 3, the surfaces 33 of the inserts 32 will provide some additional friction and further will wipe and scour the surface 4 of the flange, tending to smooth any grooves or scores resulting from any abrasive material accumulated on the brake surfaces. This brake structure will not only tend to maintain the flange surface 4 in smooth condition, but also if applied to drum flanges which have been already worn and grooved from previous wear, will tend to remove the imperfections and restore the smooth condition to the surface for maximum braking efficiency.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In combination with a metallic brake band having one end anchored and the other end movable, a liner including a plurality of blocks of woven fabric secured to said brake band to present a wearing face adapted to be pressed against a cylindrical moving surface, and a plurality of relatively narrow, spaced hard molded asbestos inserts, said inserts contained only in certain of said blocks adjacent the anchored end of the band, said inserts extending transversely of the direction of movement of said moving surface and having a face flush with said wearing face of said blocks whereby said inserts scour and wipe said moving surface to smooth same.

2. In combination with a metallic brake band having one end anchored and the other end movable, a liner including a plurality of blocks of woven asbestos-wire fabric secured to said brake band to present a wearing face adapted to be pressed against a cylindrical moving surface, certain of said blocks adjacent the anchored end of the band having grooves therein extending transversely of the direction of movement of said moving surface with the side surfaces of said grooves converging toward the block face when said block face is maintained in a curved condition to substantially conform to said moving surface, and an insert tightly retained in each of said grooves due to said convergence of said side surfaces, said inserts each being of hard molded asbestos and having a face flush with said wearing face of said blocks whereby said inserts scour and wipe said moving surface to smooth same.

References Cited in the file of this patent

UNITED STATES PATENTS

| | | |
|---|---|---|
| 695,248 | Streeter | Mar. 11, 1902 |
| 1,219,824 | Kinzer | Mar. 20, 1917 |
| 1,406,049 | McIlroy | Feb. 7, 1922 |
| 1,468,634 | Headson | Sept. 25, 1923 |
| 1,672,486 | Ewing | June 5, 1928 |
| 1,752,377 | Glueck | Apr. 1, 1930 |
| 1,758,253 | Greenwood | May 13, 1930 |
| 2,033,968 | Fether | Mar. 17, 1936 |
| 2,070,947 | Klemm | Feb. 16, 1937 |
| 2,713,923 | Eksergian et al. | July 26, 1955 |

FOREIGN PATENTS

| | | |
|---|---|---|
| 1,157,129 | France | Dec. 23, 1957 |